United States Patent [19]

Arbisi et al.

[11] Patent Number: 4,585,977
[45] Date of Patent: Apr. 29, 1986

[54] ELECTRONIC MOTOR

[76] Inventors: Dominic Arbisi, 13001 Berkshire Dr., Minnetonka, Minn. 55343; Roger E. Mitchell, 3710 Vincent Ave. South, Minneapolis, Minn. 55410

[21] Appl. No.: 678,171

[22] Filed: Dec. 4, 1984

[51] Int. Cl.[4] ............................................. H02K 33/00
[52] U.S. Cl. ......................................... 318/45; 318/37; 318/102; 318/119; 318/128; 310/36; 310/37
[58] Field of Search ................. 318/45, 114, 115, 116, 318/118, 119, 125, 126, 128, 129, 130, 131, 132, 102, 37, 42, 41; 310/36, 37, 38, 39, 114

[56] References Cited

U.S. PATENT DOCUMENTS

| | | | |
|---|---|---|---|
| 1,577,460 | 3/1926 | Franca | 318/128 |
| 1,588,286 | 6/1926 | Weismann | 318/37 X |
| 2,590,168 | 3/1952 | Felici | 315/223 |
| 2,791,732 | 5/1957 | Jones | 318/119 |
| 2,931,929 | 4/1960 | Snowdon et al. | 310/156 |
| 2,965,824 | 12/1960 | Hirtreiter | 318/125 X |
| 3,161,793 | 12/1964 | Laithwaite | 310/27 |
| 3,293,459 | 12/1966 | Kreuter et al. | 310/49 |
| 3,718,829 | 2/1973 | Wilson | 310/27 |
| 3,769,531 | 10/1973 | Elkuch | 310/6 |
| 3,832,608 | 8/1974 | Mills | 318/37 |
| 4,019,103 | 4/1977 | Davis et al. | 318/37 |
| 4,092,570 | 5/1978 | Nakamoto | 318/102 |
| 4,249,116 | 2/1981 | Hieda | 318/254 |
| 4,357,551 | 11/1982 | Dulondel | 310/46 |
| 4,359,673 | 11/1982 | Bross, Jr. et al. | 318/119 X |
| 4,404,503 | 9/1983 | Ward et al. | 318/119 |

FOREIGN PATENT DOCUMENTS 965565 9/1950 France.
57-85568(A) 5/1982 Japan.
550249 12/1942 United Kingdom.

OTHER PUBLICATIONS

IBM Technical Disclosure Bulletin, vol. 15, No. 1, Jul. 1972.

Primary Examiner—William M. Shoop, Jr.
Assistant Examiner—Shik Luen Paul Ip
Attorney, Agent, or Firm—Kinney & Lange

[57] ABSTRACT

An electronic motor includes a shaft mounted for rotation about a rotational axis. A plurality of radial lever arms are mounted with respect to the shaft. Each lever arm has an inner end connected to the shaft by a one-way clutch. The clutches allow the shaft to rotate in only a first circumferential direction with respect to the lever arms. An electrically conductive element is attached to an outer end of each lever arm. A drive coil is positioned adjacent to each electrically conductive element. A drive circuit periodically and sequentially energizes each drive coil with current pulses. Each drive coil is oriented to produce a first pulsed magnetic field in a direction generally tangential to the circumferential direction when energized. The first magnetic field induces circulating currents within the electrically conductive element. The circulating currents in turn produce a second magnetic field about the electrically conductive element. The first and second magnetic fields interact and force the radial lever arm to rotate in the first circumferential direction thereby engaging and rotating the shaft.

32 Claims, 2 Drawing Figures

ELECTRONIC MOTOR

BACKGROUND OF THE INVENTION

1. Field of the Invention

The present invention relates to motors. In particular, the present invention is an electronic motor in which a shaft is rotated by lever arms which are driven by interactive magnetic fields.

2. Description of the Prior Art

Electric motors have become a mainstay of everyday life. No home, factory or place of business could function without them. Many different types of motors have been developed to meet this myriad of uses. DC motors, for example, may be of a shunt or series type. An AC motor may be of the synchronous type, or an induction machine.

Functional characteristics of each type vary. Efficiency, speed range, speed stability, load capacity, power requirements and starting ability are important operating charcteristics. Typically, the environment and application to which the motor is to be put will dictate a set of operating parameters. Characteristics of specific motors must then be matched to those parameters in order to arrive at the correct motor type for the application. Use, therefore, dictates choice.

It may be readily understood that there is a continuing need for new types of motors which enable the designer to better match the motor to the application. New motors having reduced weight and higher efficiencies are always desirable.

SUMMARY OF THE INVENTION

The present invention is an electronic motor which includes a shaft mounted for rotation about a rotational axis. A first radial lever arm is mounted on the shaft so that an inner end of the lever arm is connected to the shaft by one-way clutch means. A first electrically conductive element is attached to an outer end of the lever arm. Postioned adjacent to the electrically conductive element is a first drive means. A first drive circuit means periodically energizes the first drive means.

The first drive means is oriented to produce, when energized, a first pulsed magnetic field in a direction generally tangential to a circumferential direction with respect to the rotational axis. The first magnetic field induces circulating currents within the conductive element. The circulating currents in turn produce a second magnetic field which interacts with the first magnetic field to force the lever arm to rotate in a first circumferential direction, thereby rotating the shaft.

Preferred embodiments of the electronic motor include a second lever arm which has an inner end connected to the shaft by a second one-way clutch means. A second electrically conductive element is attached near an outer end of the second lever arm. A second drive means is positioned adjacent thereto. A second drive circuit means periodically energizes the second drive means. These elements operate in a manner identical to their counterparts.

The electrically conductive elements are preferably formed of paramagnetic metal, such as aluminum. The drive means preferably include coil means which are flat, and are circularly wound about an air core.

The first and second drive circuit means preferably include high voltage capacitors which produce current pulses for energizing the drive means. Control means provide control signals to the drive circuit means as a function of desired motor speed and actual motor speed.

DETAILED DESCRIPTION OF THE PREFERRED EMBODIMENTS

Figure 1:
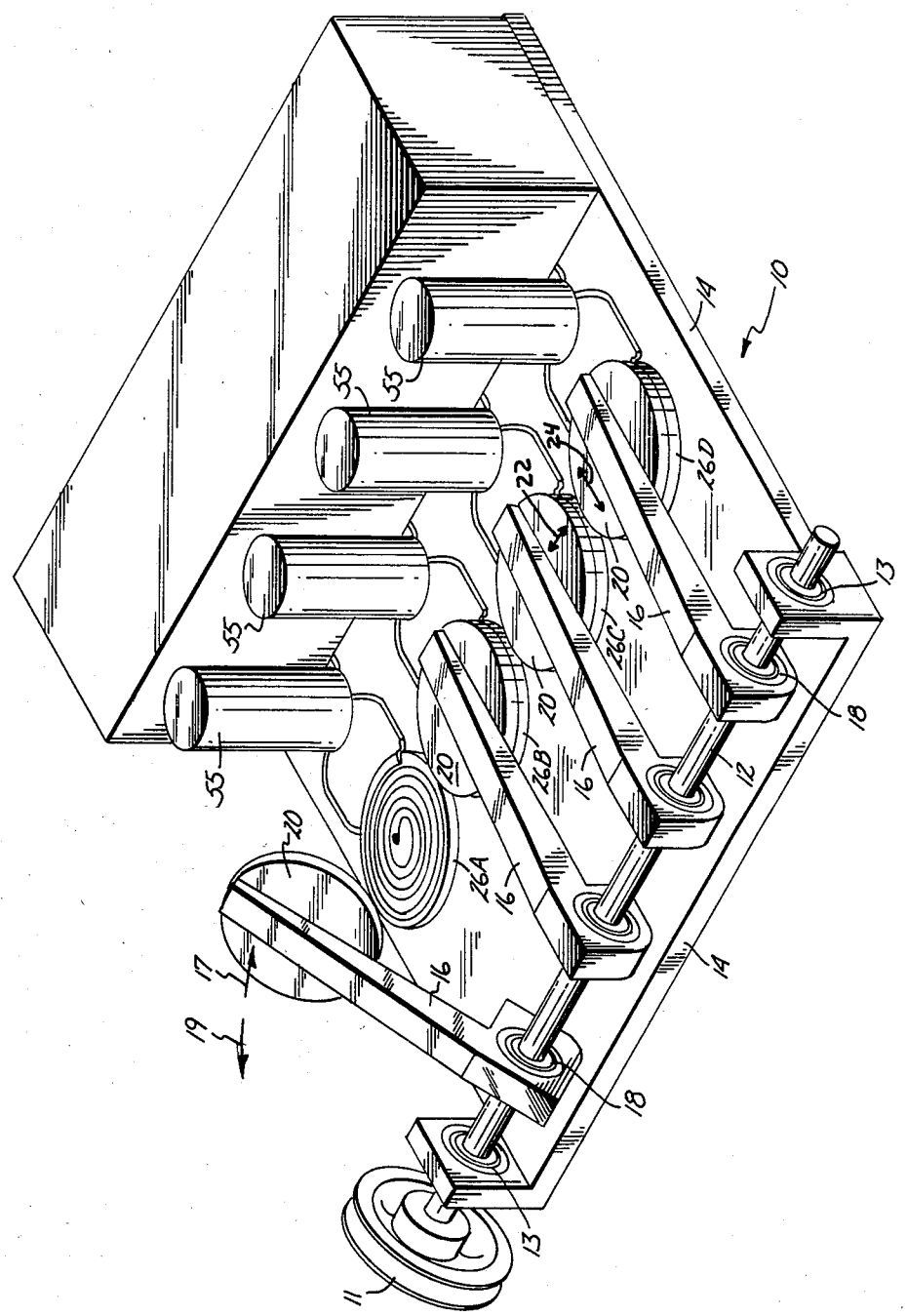
FIG. 1 is a perspective view of the electronic motor of the present invention.

As illustrated in FIG. 1, electronic motor 10 of the present invention is a low profile motor suitable for a variety of applications. Unlike conventional electric motors, electronic motor 10 utilizes interactive magnetic field pulses to produce rotational motion. Included is a drive shaft 12 mounted for rotation about a rotational axis. As shown in FIG. 1, drive shaft 12 is mounted with respect to base 14 by means of bearings 13. Bearings 13 are ball bearings, roller bearings or other similar devices which allow low friction rotation of drive shaft 12. A pulley 11 or other linkage mechanism is used to transmit rotational motion from shaft 12 to a device (not shown) which utilizes that rotational motion.

Drive shaft 12 is driven by one or more lever arms 16 (for purposes of example, four are shown in FIG. 1). Each lever arm 16 is oriented in a radial direction with respect to shaft 12. Lever arms 16 are manufactured from any rigid material. In a preferred embodiment, lever arms 16 are made of plastic which is strong, yet lightweight. A length of lever arms 16 is dependent upon the performance characteristics of the particular application for which motor 10 is being developed. Other design parameters such as overall size and cost considerations may also influence this decision.

Clutch means 18 are used to connect an inner end of each lever arm to shaft 12. Clutch means 18 are one-way clutches which allow lever arms 16 to engage and thereby rotate drive shaft 12 when they are rotated in a first circumferential direction with respect to the rotational axis (illustrated generally by arc 17). The one-way action of clutch means 18 allows each lever arm 16 to rotate in a second circumferential direction (illustrated by arc 19) free of shaft 12. Preferred embodiments of motor 10 utilize roller clutch bearings manufactured by the Torrington Company. Grip-roller, free-wheeling or other unidirectional clutches will work as well.

An electrically conductive element 20 is rigidly attached near an outer end of each lever arm 16. In the preferred embodiment shown in FIG. 1, conductive elements 20 form a plane defined by first dimension 22 and second dimension 24. Conductive elements 20 are attached to lever arms 16 such that first dimension 22 is parallel to drive shaft 12 while second dimension 24 is parallel to the radial direction. Conductive elements 20 are preferably thin plates of paramagnetic material, such as aluminum. Screws, glue or similar means (not shown) are used to attach conductive elements 20 to lever arms 16.

A drive coil 26A-26D is positioned adjacent to each conductive element 20. As shown in FIG. 1, each drive coil 26 is attached to base 14 at a point directly below the respective conductive element 20. Drive coils 26A-26D are oriented to produce a magnetic field in a direction generally tangential to the circumferential direction when energized. In preferred embodiments, drive coils 26A–26D are comprised of wire coils circularly wound about an air core. The coils are flat and form a plane oriented in a direction normal to the tangential direction.

Motor 10 produces rotational motion by harnessing explosive forces developed by large interactive magnetic fields. Current pulses of large magnitude are periodically and sequentially applied to each drive coil 26A–26D. When driven, each drive coil 26A–26D produces a first pulsed magnetic field. As previously described, the pulsed magnetic field will emanate from drive coils 26A–26D in a direction tangential to the circumferential direction. The first magnetic field will thereby impinge upon the adjacent conductive element 20.

Since the first magnetic field is pulsed, it rapidly expands and retracts. This changing magnetic field induces circulating currents within the adjacent electrically conductive element 20 in accordance with well known laws of electromagnetics. The circulating currents always tend to flow in a direction perpendicular to the first magnetic field and in such a direction as to oppose any changes in that magnetic field. The circulating currents, in turn, develop a second magnetic field which emanates from the conductive element 20. The second magnetic field is oriented in a direction generally normal to conductive element 20 and is in an opposing direction to the first magnetic field.

The first magnetic field developed by drive coil 26, and the second magnetic field developed by conductive element 20, are therefore opposed to one another. These fields interact to create a repulsive force on conductive element 20 and drive coil 26. This repulsive force causes arm 16 to rotate in the first circumferential direction, as shown by arc 17, thereby engaging and rotating drive shaft 12. In the embodiment shown in FIG. 1, lever arm 16 will fall back to its original position adjacent drive coil 26 under the force of gravity.

Figure 2:
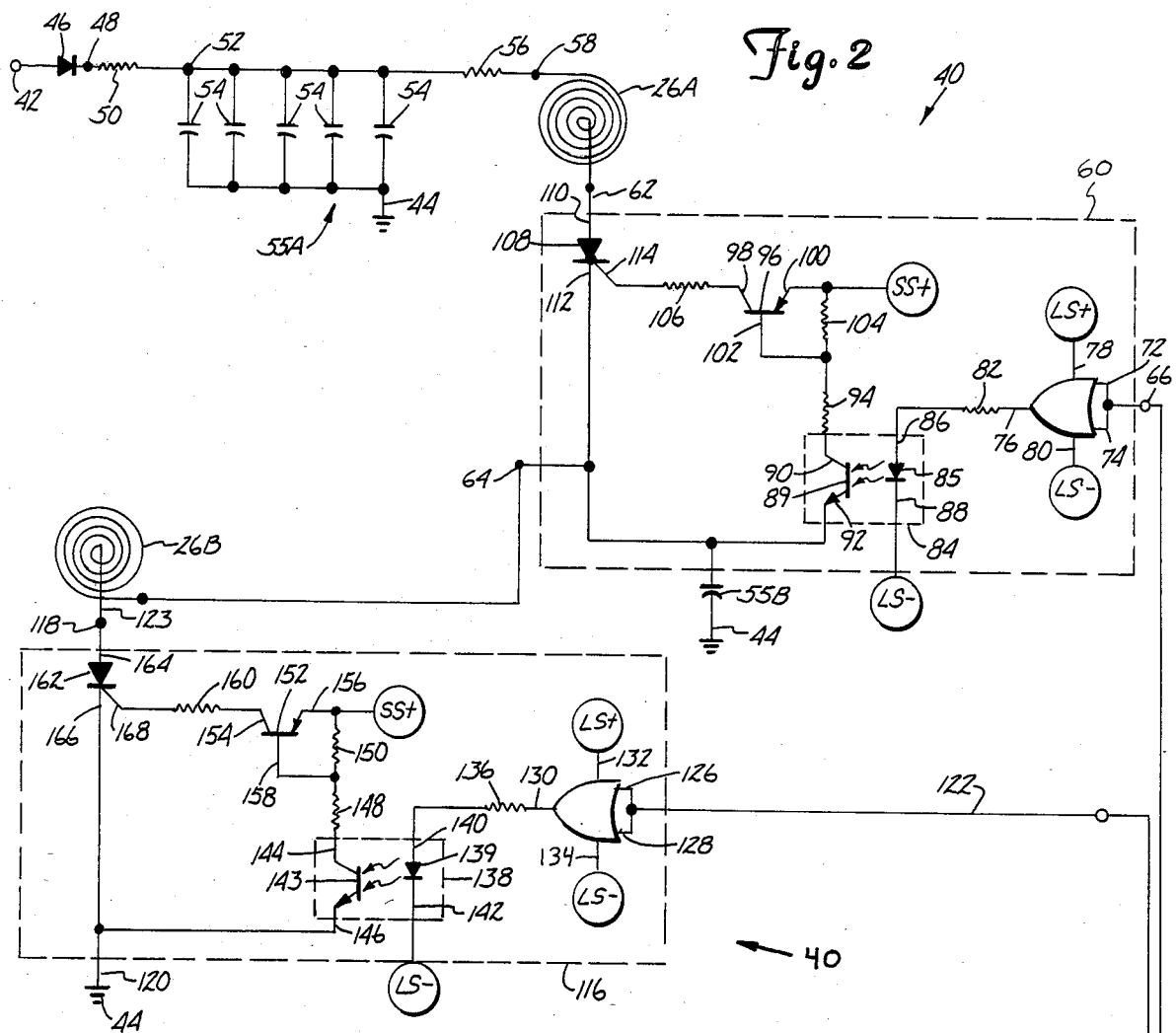
FIG. 2 is a schematic representation of a drive system for the electronic motor, and a block diagram of a control system for the electronic motor.
Figure 2:
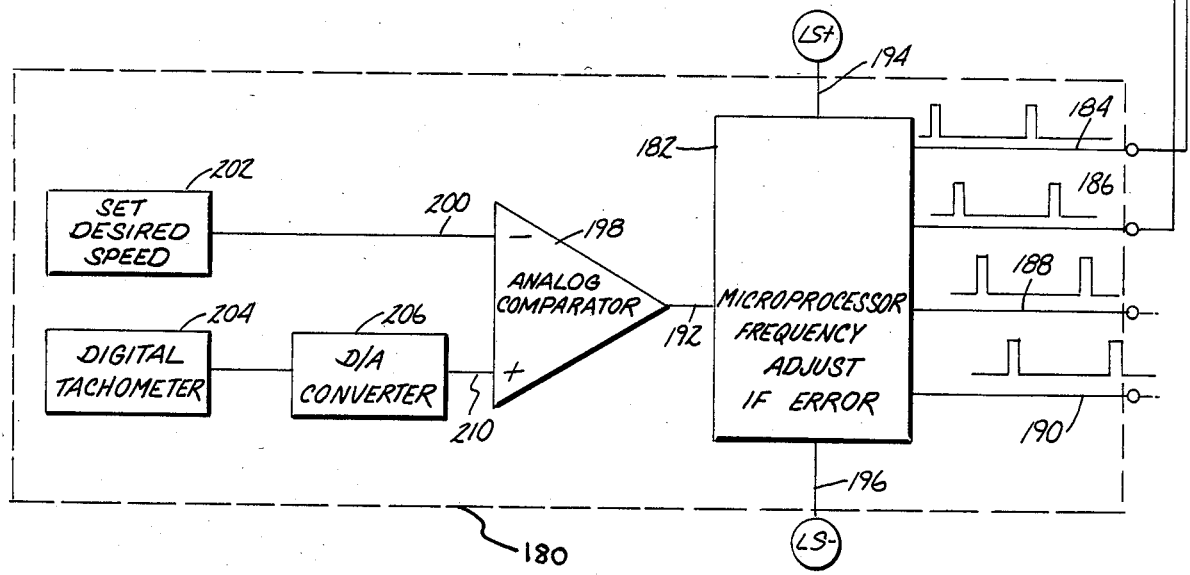

In preferred embodiments of electronic motor 10, drive coils 26A–26D are periodically and sequentially energized so that drive shaft 12 is being driven by only one lever arm 16 at any given instant in time. A drive system 40 which sequentially energizes two drive coils 26 with current pulses of large magnitude is schematically represented in FIG. 2. Drive system 40 is preferably mounted to base 14 and enclosed by cover 15. A high voltage AC or DC supply potential is applied between supply input terminal 42 and supply ground 44. Rectifier diode 46 is connected between supply input terminal 42 and node 48. Resistor 50 is connected between node 48 and node 52. A plurality of high voltage capacitors 54 are connected in a parallel circuit between node 52 and supply ground 44. High voltage capacitors 54 form a first capacitor bank 55A, which stores electric energy which will be selectively applied to a first drive coil 26A through resistor 56. Resistor 56 is connected between node 52 and a first lead 58 of first drive coil 26A. First capacitor bank 55A can discharge current pulses of large magnitude and still be quickly recharged.

First switching circuit 60 has first and second terminals 62 and 64, respectively, connected to control the flow of electric current from first capacitor bank 55A through first drive coil 26A as a function of a first control signal received at first control terminal 66. The first control signal is preferably a pulse train which has first and second logic levels. When the second level (e.g., a logic "low" or "0") of the first control signal is applied to control terminal 66, first switching circuit 60 is in its "OFF" state. When in its "OFF" state, first switching circuit 60 functions as an open circuit between terminals 62 and 64. During this period of time, first capacitor bank 55A is recharged by current flowing from input terminal 42 through diode 46 and resistor 50. No current flows through first drive coil 26.

When the first level (e.g., a logic "high" or "1") of the first control signal is applied to first control terminal 66, first switching circuit 60 is switched to its "ON" state. When in its "ON" state, first switching circuit 60 functions as a closed circuit between terminals 62 and 64. During this time, a current pulse from capacitors 54 flows through and energizes first drive coil 26A. This current flow is directed to and charges a second capacitor bank 55B. As shown in FIG. 2, second capacitor bank 55B is connected between terminal 64 and supply ground 44. Electric current used to energize the first drive coil 26A is therefore used to charge the second capacitor bank 55B.

In a preferred embodiment of the present invention, several individual circuit elements form first switching circuit 60. First OR gate 70 has two input terminals 72 and 74, an output terminal 76 and logic supply terminals 78 and 80. Logic supply terminal 78 is connected to receive a relatively positive logic supply potential (LS+) while logic supply terminal 80 is connected to receive a relatively negative logic supply potential (LS−). Input terminals 72 and 74 are both connected to control terminal 66 to receive the first control signal. OR gate 70 acts as a buffer, and converts the first control signal to voltage levels compatible with other circuit elements of first switching circuit 60.

Resistor 82 has a first terminal connected to output terminal 76 of first OR gate 70. First isolation means 84 is an optoelectronic device which includes a light emitting diode 85 having an anode 86 connected to a second terminal of resistor 82, and a cathode 88 connected to the relatively negative logic supply potential (LS−). Isolation means 84 also includes phototransistor 89 having a collector 90 connected to a first terminal of resistor 94 and an emitter 92 connected to terminal 64 of first switching circuit 60.

Transistor 96 has a collector 98, an emitter 100 and a base 102. Base 102 is connected to a second terminal of resistor 94. Emitter 100 is connected to receive a relatively positive switching supply potential (SS+). Resistor 104 is connected between base 102 and emitter 100 of transistor 96. Resistor 106 has a first terminal connected to collector 98 of transistor 96.

Silicon controlled rectifier (SCR) 108 has an anode 110, a cathode 112 and a gate 114. Anode 110 is connected to first terminal 62 of first switching circuit 60. Cathode 112 is connected to second terminal 64 of first switching circuit 60. Gate 114 of SCR 108 is connected through resistor 106 to collector 98 of transistor 96. Firing of SCR 108 is initiated by a potential applied to gate 114 through transistor 96. SCR 108 is commutated after a discharge of first capacitor bank 55A as cathode 112 becomes more positive than anode 110.

Second switching circuit 116 has first and second terminals 118 and 120 connected to control the flow of electric current from second capacitor bank 55B through a second drive coil 26B as a function of a second control signal received at a second control terminal 122. Terminal 118 is connected to a lead 123 of a second drive coil 26B. Terminal 120 is connected to supply ground 44. Control terminal 122 is connected to receive a second control signal.

The second control signal received by second control terminal 122 is, like the first control signal, a pulse train having first and second logic levels. When the second level (e.g. "low" or "0") of the second control signal is applied to control terminal 122, second switching circuit 116 is in its "OFF" state. In its "OFF" state second switching circuit 116 operates as an open circuit, and no current flows through the second drive coil 26B. When the first level (e.g., "high" or "1") of the second control signal is applied to control terminal 122, second switching circuit 116 is in its "ON" state. When in its "ON" state, second switching circuit 116 functions as a closed circuit, and allows current to flow from second capacitor bank 55B through the second drive coil 26B.

Second switching circuit 116 is formed by a number of circuit elements. Second OR gate 124 has input terminals 126 and 128, output terminal 130 and logic supply terminals 132 and 134. Logic supply terminal 132 is connected to receive a relatively positive logic supply potential (LS+), while logic supply terminal 134 is connected to receive a relatively negative logic supply potential (LS−). Input terminals 126 and 128 are connected together, and are in turn connected to second control terminal 122 of second switching circuit 116. OR gate 124 functions as a buffer and converts the second control signal into logic level potentials at output terminal 130 which are compatible with the rest of the circuit elements of second switching circuit 116. Resistor 136 has a first terminal connected to output 130 of OR gate 124.

Isolation means 138 is an optoelectronic device containing a light emitting diode 139 having an anode 140 and a cathode 142. Isolation means 138 also contains a phototransistor 143 having a collector 144 and an emitter 146. Anode 140 is connected to a second terminal of resistor 136. Cathode 142 is connected to receive the relatively negative logic supply potential (LS−). Emitter 146 is connected to supply ground 44. Resistor 148 has a first terminal connected to collector 144 of isolation means 138. Resistor 150 has a first terminal connected to a second terminal of resistor 148. A second terminal of resistor 150 is connected to receive the relatively positive switching supply potential (SS+).

Transistor 152 includes a collector 154, an emitter 156 and a base 158. Base 158 is connected to the first terminal of resistor 150, while emitter 156 is connected to a second terminal of resistor 150. Resistor 160 has a first terminal connected to collector 154 of transistor 152.

Silicon controlled rectifier (SCR) 162 includes anode 164, cathode 166 and gate 168. Anode 164 is connected to terminal 118 and cathode 166 is connected to terminal 120 and thus to supply ground 44. Gate 168 is connected to a second terminal of resistor 160. Firing of SCR 162 is initiated by a potential applied to gate 168 through transistor 152. SCR 162 is commutated when second capacitor bank 55B is fully discharged.

Although drive system 40 shown in FIG. 2 and described above is used to drive both drive coils 26A and 26B, it is to be understood that the system is symmetrical, one-half of which can be used to energize individual drive coils 26A–26D. For instance, first switching circuit 60 could be used to drive only drive coil 26A by connecting second terminal 64 directly to supply ground 44, thereby bypassing second capacitor bank 55B and second switching circuit 116.

Control system 180, as shown in FIG. 2, is designed for use with motor 10 and drive system 40. The primary element of control system 180 is microprocessor 182 which generates control signals utilized by individual switching circuits. As also shown in FIG. 2, control system 180 provides first, second, third and fourth control signals at output terminals 184, 186, 188 and 190, respectively. Each control signal is supplied to a respective switching circuit which will selectively energize one of the four drive coils 26 illustrated in FIG. 1. Output terminals 184 and 186 are, for example, connected to input terminals 66 and 122 of first and second switching circuits 60 and 116, respectively, as shown in FIG. 2.

Microprocessor 182 includes an input terminal 192 and first and second logic supply terminals 194 and 196, respectively. First logic supply terminal 194 is connected to receive a relatively positive logic supply potential (LS+), while second logic supply terminal 196 is connected to receive a relatively negative logic supply potential (LS−). Microprocessor 182 preferably includes associated program and read/write storage, clock circuitry, and interface circuitry.

The first, second, third and fourth control signals produced by microprocessor 182 consists of a series of pulses. The pulses have a second level, which when applied to the respective switching circuit, will cause the switching circuit to be in its "OFF" state, and a first lever which when applied to the respective switching circuit will cause the switching cicuit to be in its "ON" state. The control signals are sequenced by microprocessor 182 in such a manner that only one drive coil 26 is energized at any particular time. For example, the four control signals shown in FIG. 3 are 90° out of phases with respect to each other. The duty cycle of the control signal is relatively low. The respective switching circuits are, therefore, in their "OFF" state most of the time. This low duty cycle minimizes motor heating.

A frequency of the first through fourth control signals is determined by microprocessor 182 as a function of an input signal applied to input terminal 192. In one preferred embodiment of the present invention, the input signal is an analog voltage potential indicative of the difference between a desired motor speed and an actual motor speed. This analog signal is produced by analog comparator 198 and is converted to a digital signal by an analog-to- digital converter which is a part of the interface circuitry of microprocessor 182. Analog comparator 198 has applied to its input terminal 200 an analog potential from speed selector 202. Speed selector 202 provides a signal indicative of a desired motor speed. An analog signal indicative of actual motor speed (and, for example, produced by digital tachometer 204 and digital-to-analog converter 206) is applied to input terminal 210. Alternatively, both a digital signal representative of the desired motor speed from speed selector 202 and a digital signal from signal tachometer 204 can be supplied directly to microprocessor 182. In either embodiment, the frequency is preferably controlled as a function of the sign and magnitude of the error. For example, if the actual speed is less than the desired speed, the frequency is increased, and vice versa. The amount of increase or decrease in frequency is based upon the magnitude of the speed error.

In summary, the present invention is a low profile motor in which interactive magnetic field pulses are used to produce rotational motion. Although the present invention has been described with reference to preferred embodiments, workers skilled in the art will recognize that changes may be made in form and detail without departing from the spirit and scope of the invention.

What is claimed is:

1. An electronic motor comprising:
   a shaft mounted for rotation about a rotational axis;
   a first lever arm positioned in a radial direction with respect to the shaft;
   a first one-way clutch means for connecting an inner end of the lever arm to the shaft;
   a first electrically conductive element attached to an outer end of the lever arm;
   a first drive means positioned adjacent to the electrically conductive element for producing a first pulsed magnetic field generally tangential to a circumferential direction about the rotational axis when energized, the first magnetic field inducing circulating currents within the conductive element which in turn produce a second magnetic field, the first and second magnetic fields interacting to force the first lever arm to rotate in a first circumferential direction thereby engaging and rotating the shaft; and
   a first drive circuit means for periodically energizing the first drive means.

2. The electronic motor of claim 1 wherein the conductive element is a flat metal plate forming a plane having a first and a second axis, the first axis oriented in the radial direction and the second axis oriented in a direction parallel to the rotational axis.

3. The electronic motor of claim 2 wherein the conductive element is formed of paramagnetic metal.

4. The electronic motor of claim 3 wherein the conductive element is formed of aluminum.

5. The electronic motor of claim 1 wherein the drive means include coil means.

6. The electronic motor of claim 5 wherein the coil means is essentially flat, has an air core and is circularly wound.

7. The electronic motor of claim 1 wherein the first drive circuit means supplies current pulses to the first drive means.

8. The electronic motor of claim 7 wherein the first drive circuit means sequentially applies current pulses to the first drive means.

9. The electronic motor of claim 1 wherein the first drive circuit means for energizing the first drive means comprises:
   first storage means for storing electric energy;
   first switching means having an "on" and an "off" state for controlling the flow of electric energy from the first storage means through the first drive means, the first switching means having a first and a second terminal connected in series with the first storage means and the first drive means and a control terminal connected to receive a first control signal, the first switching means acting as a closed circuit in its "on" state and allowing electric energy to flow from the first storage means to the first drive means when the first control signal has a first level, and acting as an open circuit in its "off" state when the first control signal has a second level; and
   means for providing the first control signal.

10. The electronic motor of claim 9 wherein the means for providing the first control signal comprises:
   means for providing a desired speed signal which is a function of a desired motor speed;
   means for providing an actual speed signal which is a function of actual speed of the motor; and
   means for producing the first control signal as a function of the desired speed signal and the actual speed signal.

11. The electronic motor of claim 10 wherein the means for providing the first control signal causes frequency of the first control signal to increase when the actual motor speed is less than the desired motor speed and decrease when the actual motor speed is greater than the desired motor speed.

12. The electronic motor of claim 9 wherein the storage means include capacitors.

13. The electronic motor of claim 9 and further including:
   a second lever arm positioned in a radial direction with respect to the shaft;
   a second one-way clutch means for mounting an inner end of the second lever arm to the shaft;
   a second electrically conductive element attached to an outer end of the second lever arm;
   a second drive means positioned adjacent to the second electrically conductive element for producing a third magnetic field generally tangential to the circumferential direction when energized, the third magnetic field inducing circulating currents within the second conductive element which in turn produces a fourth magnetic field, the third and fourth magnetic fields interacting to force the second lever arm to rotate in the first circumferential direction thereby engaging and rotating the shaft; and
   a second drive circuit means for energizing the second drive means.

14. The electronic motor of claim 13 wherein the second drive circuit means for energizing the second drive means comprises:
   second storage means connected in series with the first switching means for storing the electric energy which flowed through the first drive means when the first switching means was in its "on" state;
   second switching means having an "on" and an "off" state for controlling the flow of electric energy from the second storage means through the second drive means, the second switching means having first and second terminals connected in series with the second storage means and the second drive means, and a control terminal connected to receive a second control signal, the second switching means acting as a closed circuit in its "on" state and allowing electric energy to flow from the second storage means through the second drive means when the second control signal has a first level, and acting as an open circuit in its "off" state when the second control signal has a second level; and
   means for providing the second control signal.

15. The electronic motor of claim 14 wherein the means for providing the first and second control signals comprises:
   means for providing a desired speed signal which is a function of a desired motor speed;
   means for providing an actual speed signal which is a function of actual speed of the motor; and
   means for producing the first and second control signals as a function of the desired speed signal and the actual speed signal.

16. The electronic motor of claim 14 wherein the first and second drive circuit means supply current pulses to the first and second drive means, respectively.

17. The electronic motor of claim 16 wherein the first and second drive circuit means sequentially apply current pulses to the first and second drive circuit means, respectively.

18. The electronic motor of claim 13 wherein the first and second drive means include coil means.

19. The electronic motor of claim 13 wherein the first and second electrically conductive elements include flat metal plates.

20. The electronic motor of claim 19 wherein the first and second electrically conductive elements are formed of paramagnetic metal.

21. The electronic motor comprising:
a shaft mounted for rotation about a rotational axis;
a plurality of lever arms positioned in a radial direction with respect to the shaft;
one-way clutch means for connecting an inner end of each lever arm to the shaft, the clutch means allowing the lever arms to engage the shaft when rotated in a first circumferential direction with respect to the axis and allowing the lever arms to rotate in a second circumferential direction disengaged from the shaft;
an electrically-conductive element attached to an outer end of each lever arm;
drive means positioned adjacent to each electrically-conductive element, each drive means producing a first magnetic field generally tangential to the circumferential direction when energized, the first magnetic field inducing circulating currents within the conductive element which in turn produces a second magnetic field, the first and second magnetic fields interacting to force the lever arm to rotate in the first circumferential direction; and
drive circuit means for periodically energizing the drive means.

22. The electronic motor of claim 21 wherein the conductive elements are flat metal plates forming a plane having a first and a second axis, the first axis oriented in the radial direction and the second axis oriented in a direction parallel to the rotational axis.

23. The electronic motor of claim 22 wherein the conductive elements are formed of paramagnetic metal.

24. The electronic motor of claim 21 wherein the drive means include coil means.

25. The electronic motor of claim 24 wherein the coil means are essentially flat, have an air core, and are circularly wound.

26. The electronic motor of claim 21 wherein the drive circuit means sequentially energizes the drive means.

27. The electronic motor of claim 26 wherein the drive circuit means sequentially energizes the drive means with current pulses.

28. The electronic motor of claim 21 wherein the drive circuit means for energizing each drive means includes:
storage means for storing electric energy;
switching means having an "on" and an "off" state for controlling the flow of electric energy from the storage means through the drive means, the switching means having a first and a second terminal connected in series with the storage means and the drive means and a control terminal connected to receive a control signal, the switching means acting as a closed circuit in its "on" state and allowing electric energy to flow from the storage means to the drive means when the control signal has a first level, and acting as an open circuit in its "off" state when the control signal has a second level; and
means for providing the control signals.

29. The electronic motor of claim 28 wherein the means for providing the control signals comprises:
means for providing a desired speed signal which is a function of a desired motor speed;
means for providing an actual speed signal which is a function of actual speed of the motor; and
means for producing the control signals as a function of the desired speed signal and the actual speed signal.

30. The electronic motor of claim 29 wherein the means for providing the control signals causes frequency of the control signals to increase when the actual motor speed is less than the desired motor speed, and decrease when the actual motor speed is greater than the desired motor speed.

31. The electronic motor of claim 30 wherein the means for producing the control signals causes the control signals to be sequentially applied to the drive circuit means.

32. The electronic motor of claim 28 wherein the storage means include capacitors.

* * * * *